US008430980B2

(12) United States Patent
Muir et al.

(10) Patent No.: US 8,430,980 B2
(45) Date of Patent: Apr. 30, 2013

(54) STEEL MEMBER AND A METHOD OF HARD-FACING THEREOF

(75) Inventors: Darren Muir, Belmont South (AU); John McCracken, Kinross (AU)

(73) Assignee: Bradken Resources Pty Ltd, Mayfield West, NSW (AU)

( * ) Notice: Subject to any disclaimer, the term of this patent is extended or adjusted under 35 U.S.C. 154(b) by 600 days.

(21) Appl. No.: 10/546,977

(22) PCT Filed: Feb. 26, 2004

(86) PCT No.: PCT/AU2004/000245
§ 371 (c)(1),
(2), (4) Date: Nov. 3, 2005

(87) PCT Pub. No.: WO2004/076116
PCT Pub. Date: Sep. 10, 2004

(65) Prior Publication Data
US 2006/0177689 A1    Aug. 10, 2006

(30) Foreign Application Priority Data

Feb. 26, 2003  (AU) ............................. 2003900883

(51) Int. Cl.
*C21D 9/50*   (2006.01)
*C21D 9/00*   (2006.01)
*B32B 15/18*  (2006.01)

(52) U.S. Cl.
USPC ............ 148/529; 148/516; 148/524; 428/683

(58) Field of Classification Search .................... None
See application file for complete search history.

(56) References Cited

U.S. PATENT DOCUMENTS

| 4,101,318 | A |   | 7/1978  | Rudy          |         |
|-----------|---|---|---------|---------------|---------|
| 4,173,457 | A | * | 11/1979 | Smith         | 51/309  |
| 4,376,793 | A |   | 3/1983  | Jackson       |         |
| 4,650,722 | A | * | 3/1987  | Brown et al.  | 428/614 |
| 4,666,797 | A | * | 5/1987  | Newman et al. | 428/681 |
| 4,726,432 | A |   | 2/1988  | Scott et al.  |         |
| 4,873,150 | A |   | 10/1989 | Doi et al.    |         |
| 5,492,186 | A | * | 2/1996  | Overstreet et al. | 175/374 |
| 5,755,298 | A | * | 5/1998  | Langford et al. | 175/374 |
| 5,755,299 | A | * | 5/1998  | Langford et al. | 175/375 |
| 5,921,330 | A | * | 7/1999  | Sue et al.    | 175/374 |
| 6,138,779 | A | * | 10/2000 | Boyce         | 175/374 |
| 6,146,476 | A |   | 11/2000 | Boyer         |         |
| 6,280,370 | B1 |  | 8/2001  | Falkenhagen   |         |
| 6,374,704 | B1 |  | 4/2002  | Scott et al.  |         |
| 6,414,258 | B1 |  | 7/2002  | Amano         |         |
| 6,469,278 | B1 | * | 10/2002 | Boyce        | 219/146.1 |

FOREIGN PATENT DOCUMENTS

| GB | 2 311 085 A  | 9/1997  |
| GB | 2311085      | 9/1997  |
| JP | 60 216990    | 10/1985 |
| JP | 60-216990 A  | 10/1985 |

OTHER PUBLICATIONS

Derwent Abstract Accession No. 98-265693/24, JP 10085933 A (Nippon Steel Corp.) Apr. 7, 1998 Abstract.
Derwent Abstract Accession No. 23725 E/12, SU 834152A (Azov-Chernomorsk) May 31, 1981 Abstract.
Derwent Abstract Accession No. 87-268926/38, JP 62188728 A (Toyota Jidosha KK) Aug. 18, 1987 Abstract.
Key to Metals; "Classification of Carbon and Low-Alloy Steels" 3 pages 1999-2010 www.keystometals.com.

* cited by examiner

*Primary Examiner* — Jennifer McNeil
*Assistant Examiner* — Jason Savage
(74) *Attorney, Agent, or Firm* — Ladas & Parry LLP

(57) ABSTRACT

A method of hard-facing a steel casting is described in which a hard-facing, which comprises a weld alloy matrix and a hard particulate substance, is attached to the casting by welding. In some embodiments the matrix can be of a similar composition to the casting, and in other embodiments the hard particulates can be rounded and/or substantially spherical, or of a substantially even size. A method is also described for hardening and tempering a steel casting after attaching the hard-facing to the casting by welding. After hard-facing the casting is hardened and tempered by heat treatment. In one embodiment the hard-faced casting is heat treated by heating to a temperature in excess of the austenitising temperature of the steel and then cooled by quenching in an aqueous solution, followed by tempering. In one embodiment the steel casting is tempered at a temperature in the range about 550° C. to about 700° C. prior to hard-facing the casting.

17 Claims, No Drawings

STEEL MEMBER AND A METHOD OF HARD-FACING THEREOF

FIELD OF THE INVENTION

The present invention relates to a steel member and a method for hard-facing of the steel member. In particular the invention relates to a method for hard facing a cast or wrought steel product that is subjected to wear in use, and will primarily be described with reference to this context. The method of the invention may find use in the production of hard-faced steel members for all manner of mining, railroad and industrial purposes.

BACKGROUND ART

Cast or wrought steel components for use in railway stock, mining tools and equipment and industrial machinery are often subject to excessive and premature wear. The steel from which these components are manufactured is usually chosen for its ready availability and cost effectiveness, and not necessarily for optimum strength, hardness and resistance against wear or abrasion. Some steel alloys have a mixed microstructure which is not conducive to use in applications where high strength, high impact resistance, and reduced wear are required.

It is known to 'hard face' standard grade steel cast or wrought components by welding a matrix of material which includes hard particles, such as tungsten carbide particles, onto a surface of the component to provide a hard outer layer of material. Typically the carbide used is a low cost material sourced from pre-ground tool bits and tips, and is of random particle size and shape. After welding in conventional hard-facing processes, the region of the steel component closest to the welded layer is often heat affected, and may have a different metal microstructure as a result of the heat applied during the welding. The surface of the component can thus become brittle and thus lack toughness and impact resistance. Cracks between the steel component and the exterior hard-facing can propagate under load.

SUMMARY OF THE INVENTION

In a first aspect the present invention provides a method of hard-facing a steel member comprising the step of attaching a hard-facing to the member, the hard-facing comprising a weld alloy matrix and a hard particulate substance located in the matrix, the matrix attachable to the member by welding, wherein the matrix is of a similar composition to the member.

If the weld matrix alloy is of the same or similar composition to the member, it has been found that there is a better bond between the hard-facing and the member, as well as a like metal microstructure.

In a second aspect the present invention provides a method of hard-facing a steel member comprising the step of attaching a hard-facing to the member, the hard-facing comprising a weld alloy matrix and a hard particulate substance located in the matrix, the matrix attachable to the member by welding, wherein the hard particulates are rounded and/or substantially spherical.

If sharp ends of the hard particles protrude from the surface of the hard-facing, this can lead to breakage or chipping of these particles and possible erosion of the weld matrix also, which can increase the wear rate of the hard-facing.

In a third aspect the present invention provides a method of hard-facing a steel member comprising the step of attaching a hard-facing to the member, the hard-facing comprising a weld alloy matrix and a hard particulate substance located in the matrix, the matrix attachable to the member by welding, wherein the hard particulates are of a substantially even size.

This even size allows for better packing density of the hard particles in the weld matrix of the hard-facing, so that few, if any, of these particles will protrude from the surface of the hard-facing, thus limiting possible erosion or breakage of the weld matrix.

When the term "steel member" is used herein it includes any cast steel product or to any type of wrought steel product, wrought products being shaped by forging or other mechanical formation processes whilst heated. Such products can include a wide variety of components of many shapes and sizes, for example steel bars, plates, pins, yokes, connectors, shovel buckets, cutting teeth, etc.

The step of attaching a hard-facing to the member may be followed by hardening and tempering of the hard-faced member by heat-treatment.

In one embodiment the hardening and tempering of the hard-faced member comprises the steps of hardening the member by:
  heating the member to a temperature in excess of the austenitising temperature of the steel; and
  cooling the member by quenching it in an aqueous solution;
followed by the steps of tempering the member by:
  heating the member to a suitable tempering temperature; and
  cooling the member.

By having the hardening and tempering heat treatment steps after the welding step, the metal microstructure of the steel member can be again transformed so that the microstructure of the member itself is not embrittled. This is particularly so in the heat affected zone located in that part of the member nearest to the weld. The austenitising temperature and the tempering temperature are selected depending on the chemical composition of the steel member as will be described in more detail.

In general the member is hardened by heating it in excess of the austenitising temperature for a minimum interval calculated depending on the thickness of the member.

In one embodiment the temperature at which the member is hardened is about 900-1000° C., and, once heated, the member is then quenched in an aqueous solution until the member is cooled to an ambient temperature.

In general the member is tempered by heating it at the tempering temperature for a minimum interval calculated depending on the thickness of the member.

In one embodiment the tempering temperature is in the range about 200° C. to about 650° C. and the member is cooled post-tempering by quenching in an aqueous solution until the member is cooled to an ambient temperature.

In one embodiment the particulate substance comprises particles of a size diameter between about 0.5 millimetres and about 5 millimetres. The hard particulate substance may be sintered tungsten carbide, or alternatively the hard particulate substance may be macrocrystalline (or cast) tungsten carbide.

In a fourth aspect the present invention provides a method of hardening and tempering a steel member after attaching a hard-facing to the member, the method comprising the steps of hardening the member by:
  heating the member to a temperature in excess of the austenitising temperature of the steel; and
  cooling the member by quenching it in an aqueous solution;
followed by the steps of tempering the member by:

heating the member to a suitable tempering temperature; and cooling the member.

The metal microstructure of the region of the steel member near to its surface can be altered by the attachment step if heating is involved, and a heat affected zone in the member can result. By conducting the hardening and tempering heat treatment steps after the hard-facing attachment step, the metal microstructure of the steel member adjacent to the resultant hard-facing can be transformed so as not to be embrittled and inferior. Aqueous quenching is a rapid way to substantially transform the metal microstructure to martensite and to limit incomplete transformation to non-preferred microstructures and to avoid the formation of undesirable properties associated with temper embrittlement. Cooling fluids of other tapes such as oil or even ambient air do not remove heat from the castings as quickly or as evenly as an aqueous solution.

The hardening and tempering steps may be as otherwise defined in any one of the first, second or third aspects.

In one embodiment the method comprises the step of tempering the member prior to attaching the hard facing to the member. In one advantageous embodiment of this pre-weld tempering, the tempering temperature is in the range about 550° C. to about 700° C., and in one particularly advantageous embodiment the tempering temperature is in the range about 600° C. to about 650° C. These pre-weld tempering temperatures are higher than the pre-weld tempering temperatures used in known prior art processes. In this higher temperature range the inventors have discovered that increased softening of the member occurs, which surprisingly results in better metal grain structure refinement and modification of residual stresses.

In one embodiment, the hard-facing may comprise a weld alloy matrix and a hard particulate substance located in the matrix, the weld alloy matrix attachable to the member by welding, wherein the matrix is of a similar composition to the member.

In a further embodiment, the hard-facing may comprise a weld alloy matrix and a hard particulate substance located in the matrix, the matrix attachable to the member by welding, wherein the hard particulates are rounded and/or substantially spherical.

In a still further embodiment, the hard-facing may comprise a weld alloy matrix and a hard particulate substance located in the matrix, the matrix attachable to the member by welding, wherein the hard particulates are of a substantially even size.

In a fifth aspect the present invention provides a method of treating a steel member comprising the steps of:
  tempering the member at a temperature in the range about 550° C. to about 700° C. prior to hard-facing the member by the steps of:
  attaching a hard-facing to the member, the hard-facing comprising a weld alloy matrix and a hard particulate substance located in the matrix, the matrix attachable to the member by welding; followed by
  hardening and tempering of the member by heat treatment.

The tempering of the member carried out prior to hard-facing is performed at a temperature that is higher than the temper embrittlement zone of alloy steel which contain some quantity of nickel, chromium and manganese metal, which is typically in the range of 300° C.-500° C. The tempering temperature range of about 550° C. to about 700° C. is also higher than the pre-weld tempering temperatures used in known prior art processes of around 250° C.-350° C. In this higher temperature range the inventors have discovered that increased softening of the member occurs, which surprisingly results in superior metal grain structure refinement and better modification of residual stresses than achieved at lower tempering or pre-heating temperatures. In one advantageous embodiment, the tempering temperature used prior to hard-facing is in the range about 600° C. to about 650° C.

In one embodiment the method of treating a steel member as defined in the fifth aspect can have hardening and tempering steps after hardfacing that are as otherwise defined in the first, second or third aspects.

In one embodiment the method of treating a steel member as defined in the fifth aspect can have the matrix and/or the hard particulates that are as otherwise defined in the first, second or third aspects.

In a sixth aspect the present invention provides a steel member that has been hard-faced by a method comprising the step of attaching a hard-facing to the member, the hard-facing comprising a weld alloy matrix and a hard particulate substance located in the matrix, the matrix attachable to the member by welding, wherein the matrix is of a similar composition to the member.

In a seventh aspect the present invention provides a steel member that has been hard-faced by a method comprising the step of attaching a hard-facing to the member, the hard-facing comprising a weld alloy matrix and a hard particulate substance located in the matrix, the matrix attachable to the member by welding, wherein the hard particulates are rounded and/or substantially spherical.

In an eighth aspect the present invention provides a steel member that has been hard-faced by a method comprising the step of attaching a hard-facing to the member, the hard-facing comprising a weld alloy matrix and a hard particulate substance located in the matrix, the matrix attachable to the member by welding, wherein the hard particulates are of a substantially even size.

In one embodiment the steel member of the sixth, seventh or eighth aspects can have the matrix and/or the hard particulates are otherwise as defined in the first, second or third aspects.

In a ninth aspect the present invention provides a steel member that has been hard-faced by a method of hardening and tempering after attaching a hard-facing to the member, the method comprising the steps of hardening the member by:
  heating the member to a temperature in excess of the austenitising temperature of the steel; and
  cooling the member by quenching it in an aqueous solution;
followed by the steps of tempering the member by:
  heating the member to a suitable tempering temperature; and
  cooling the member.

In one embodiment the hardening and tempering steps are as otherwise defined in the first, second or third aspects.

In a tenth aspect the present invention provides a steel member that has been treated by a method comprising the steps of:
  tempering the member at a temperature in the range about 550° C. to about 700° C. prior to hard-facing the member by the steps of:
  attaching a hard-facing to the member, the hard-facing comprising a weld alloy matrix and a hard particulate substance located in the matrix, the matrix attachable to the member by welding; followed by
  hardening and tempering of the member by heat treatment.

In one embodiment the hardening and tempering steps are as otherwise defined in the first, second, third, or fourth aspects.

MODES FOR CARRYING OUT THE INVENTION

The present invention provides a method for hard-facing a steel casting or cast product comprising the steps of welding a hard-facing material to the casting followed by heat treatment to harden and temper the hard-faced casting.

To prepare the casting, an alloy steel of a predetermined composition is made molten typically in an electric arc furnace and is poured into casting molds at a temperature typically in the range >1500° C., a temperature which is selected depending on the number of pours and the casting section size. One embodiment of alloy steel for casting has a composition including weight percentages of carbon in the range about <0.5%; manganese in the range about <1.2%; silicon in the range about <2.0%; nickel in the range about <3.0%; chromium in the range about <2.5% and molybdenum in the range about <1.0%. The balance of the alloy steel is iron and other incidental ingredients or trace impurities.

In any embodiment of the invention, once cooled, the metal casting is then heat treated (or 'normalised') in a furnace at a temperature in the range 900-1000° C. and typically around about 930-950° C. for a period of time (typically in excess of about 0.5-2.0 hours, depending on the casting thickness), followed by a period of air cooling.

The casting is then tempered to obtain the desired mechanical properties (degree of strength and ductility). To do this, castings are placed into a cold furnace (less than 250° C.) and the furnace temperature is raised. In one embodiment the casting is tempered by heating the casting after air cooling to a tempering temperature of about 600-650° C., although, depending on the casting, a tempering temperature in the range from about 550° C. to about 700° C. is acceptable. The tempering temperature is then maintained for a minimum interval calculated depending on the thickness of the casting, which in one embodiment is greater than a period of 6 hours. The casting is then air cooled again.

Tempering temperatures in the range 550-700° C. are higher than the tempering temperatures used in known prior art processes where tempering is followed by welding of hard-facing onto the casting surface. In the known prior art of this type, the tempering temperature (or pre-heat) is typically of the order of 250-350° C. Noting that temperatures of around 300-500° C. are in the temper embrittlement zone for alloy steels which contain some quantity of nickel, chromium and manganese metal, the inventors surprisingly discovered, after using tempering temperatures higher than this range, that the increased softening of the casting led to it having more homogeneous properties and produced a superior casting to which the hard-facing material was subsequently applied. The resulting hard-faced product was thus also superior to any previously known hard-faced steel casting.

In further embodiments of this process, molten steel of a different selected composition can be normalised and tempered at different temperatures. These heating stages are used for grain structure refinement, homogenisation and modification of residual stresses prior to the forthcoming step of welding the hard-facing onto the casting and the thermal work steps of hardening and tempering.

The casting is then either preheated (if some time has elapsed after tempering) or air cooled immediately after tempering to a temperature in the range about 200-270° C. and the hard-facing step is performed. It is preferable to preheat the casting to this temperature range for welding to avoid cold cracking. In one embodiment which will now be described in detail, a hard-facing material which comprises particles of tungsten carbide, suspended in a pool of welding matrix, is applied to the surface of a steel casting by a robotic MIG welder that has a feed hopper attached to it from which the tungsten carbide particles flow. The particles are fed into the weld matrix pool at a predetermined metered rate, depending on the carbide distribution required. The casting that is being hardfaced is held in a jig or other holding device and is rotated or manipulated by an operator or a robot during the welding process. In some embodiments it has been found that robots can assist in providing for a consistent application of hard-facing on each product.

The optimum hard-facing result is achieved when the operating parameters are controlled so that the dissolution of the tungsten carbide particles (or other hard particles) in the weldpool is minimised. Excessive dissolution of the carbides can reduce the effectiveness of the hard-facing to resist abrasive wear in service, and also has a detrimental effect on the welded alloy matrix, as high carbon and tungsten concentrations can cause embrittlement and a shortening of the life of the hard-facing. Thus both the physical parameters of the welding apparatus and the physical characteristics of the carbides (or other hard particles) are carefully controlled by an operator.

In terms of the physical parameters of the welding apparatus on the quality of the resultant hard-facing, the important control variables include the welding amps and volts, the travel speed and nozzle distance of the welder relative to the surface of the casting or wrought product being hard-faced. The angle of the welder electrode relative to the surface is also a control variable. In terms of the welding alloy matrix, the type of welding wire used and the width, depth and speed of laying the weld weave can also affect the resultant hard-facing. In terms of delivery of the hard particles, the feed rate is controllable. The physical characteristics of the selected hard particles, for example particle size, carbide type etc, are also important, as will now be described in more detail.

In one embodiment of the hard-facing process, the amps are controlled in a range between 200-400 Amps. A tradeoff exists between the desirability of using a higher amperage in this range and the effect that this has on the dissolution of tungsten carbide particles. The higher the amperage, the higher the heat in the weldpool and the higher the deposition rate of weld matrix, hence the higher the possible production rate of hard-facing material. However, too much heat in the weldpool has a tendency to dissolve the tungsten carbide to a greater extent and allow the formation of 'eta'-tungsten carbide ($W_2C$), this being a less desirable and more brittle form.

Some refinement of the control of heat in the weldpool can be effected by using a narrower welding wire diameter at a higher voltage. In one preferred embodiment a 1.6 mm diameter solid steel welding wire was used in a MIG welder. However it has been shown that welding wire of a diameter in the range 1.2 millimetres to 2.4 millimetres is also suitable. In general, a narrower width welding wire in this range produces less heat during welding to reduce tungsten carbide dissolution, distribution and embrittlement whilst still allowing use of a higher range amperage to achieve a faster deposition rate of the weld matrix.

In some embodiments the welding wire can be an alloy steel wire of a composition similar to the parent casting being hard-faced, so as to better match the hardening characteristics of the parent casting. If a weld matrix is of similar composition to the casting itself, it is likely that there will be a better bond between the hard-facing and the casting and a like microstructure, for example if the weld matrix and the casting both are of a composition that is transformed upon subsequent hardening and tempering to a largely martensitic microstructure.

In one embodiment, the voltage of the welder used is in the range 18-35 volts, selected for optimum pre-heating of the welding wire.

In one embodiment, the travel speed of the welder relative to the casting is in the range 160-380 millimetres per minute, a speed that is primarily determined by the weld weave or bead width of a strip of laid-down weld matrix. The weld bead width is maintained in a preferred range so as to optimise the solidification characteristics of the weld and the hard particle dissolution/distribution in the matrix. In one embodiment, the preferred operating range of weld bead width is 10-25 millimetres, and a preferred embodiment has a bead width of 16 millimetres. Similarly the weld bead height has a preferred operating range of 4-12 millimetres, and in a most preferred embodiment, the bead height is 6-7 millimetres. A poor quality hard-facing can result when weld matrix and hard particles are laid down so that the weld bead becomes excessively wide.

In one embodiment the tungsten carbide is deposited into the molten weld pool from a nozzle that is positioned at about 4-10 millimetres distance from the welder arc. If the tungsten carbide enters too close to the heated arc, this can have a deleterious effect on its dissolution. In one embodiment, the angle of the welder electrode is 0-40 degrees from vertical. The angle of the electrode controls the penetration of heat into the base casting member being hard-faced, as well as allowing flexibility of access to confined spaces or surfaces.

The feed rate of hard particles into the weldpool is selected based on the particle size and the selected amperage of the MIG welder. In the case of tungsten carbide, the particles are metered into the weldpool so as to achieve an optimum volume fraction and distribution of carbide in the weld deposit. In one embodiment, tungsten carbide is fed to the weldpool at a rate of between 0.25-1.35 kilograms per minute.

Conventional hard-facing processes have made use of recycled hard metals from tool bits, cutter tips and the like. The inventors have found that using such recycled materials can result in an uneven distribution of hard particles in the resultant weld matrix, and that the use of hard particles that are rounded and/or substantially spherical is preferable. It is surmised that this is because any sharp ends of the hard particles can protrude from the surface of the hard-facing, and this can lead to breakage of these particles and possible erosion or breakage of the weld matrix, which can in turn increase the wear rate of the hard-facing.

For example, in one embodiment of the invention, the hard facing material includes a particulate substance such a sintered tungsten carbide. Sintered tungsten carbide has a high level of purity, having only one form of carbide present and a generally low level of cobalt binder. Such properties provide for reliable behaviour in the weld pool. In further embodiments, the inventors have discovered that macro-crystalline tungsten carbide (WC) is a highly pure form of tungsten carbide which displays superior resistance to dissolution in the weld pool. It has been observed that this form of carbide, in comparison with others, has improved re-precipitation characteristics which help to reinforce the matrix microstructure.

In terms of the particle size of tungsten carbide particles used, the inventors have found that in some embodiments that tungsten carbide particles sized between about 0.5 millimetres and about 5 millimetres in diameter are most satisfactory. This is both a coarser and a wider possible size range of carbide material than previously known in the art, in which the carbide used generally is in the particle size range between about 0.7 millimetres and about 1.5 millimetres in width. In the selected size range, the tungsten carbide particles are thus likely to have a reduced rate of dissolution in the weld matrix, and an improved packing density in the weld matrix.

In some embodiments, the use of tungsten carbide particles of a substantially even size within that particle size range (for example, all 3.0 millimetres in diameter) has been found to allow a further improved packing density of the hard particles in the weld matrix of the hard-facing. Optimum hard particle size is selected to take into account the service requirements of the final hard-faced member. In preferred embodiments, the size range selected takes into account an allowance for reduction in tungsten carbide particle cross-section as a result of dissolution in the weld pool.

The inventors have also discovered that the use of rounded or substantially spherical hard particles can result in an improved packing of those particles in the weld matrix. It is has been found that since fewer of these particles have edges likely to protrude from the surface of the hard-facing, and as the hard particles are more fully supported about their surface by the matrix, this limits possible erosion or breakage of the weld matrix in use.

Hard substances other than sintered or macrocrystalline tungsten carbide are within the scope of the invention, such as chromium carbides and titanium carbides.

Once the hard-facing is in place, the casting is post-heated to in excess of about 200° C. The casting is then subjected to hardening and tempering by heat treatment. Firstly the casting is hardened by being heated to a temperature in excess of the austenitising temperature of the steel (AT). The AT depends on the composition of the selected casting and is calculated as:

$$AT\,(°C.)=[910]-[203 \times sqrt(\%\,C)]-[15.2 \times \%\,Ni]+[44.7 \times \%\,Si]+[104 \times \%\,V]+[31.5 \times \%\,Mo].$$

In one embodiment, the temperature at which the casting is hardened is about 900-930° C. and the casting is maintained at that temperature for a minimum interval calculated depending on the thickness of the casting. In one embodiment the minimum interval is about 2 hours. A longer residence time allows for maximum through-heating of especially thick castings. In other embodiments the castings can be heated to somewhat higher temperatures (up to around 1000° C.) and held at that temperature for a shorter interval, although this may result in less than optimal microstructures in the finished product (eg. large grain size, poor mechanical properties).

The castings are then quenched in an aqueous solution until cooled preferably to an ambient temperature. At temperatures below about 150-180° C., the metal microstructure will be substantially transformed to martensite (and incomplete transformation to bainite for example, will not occur.) The castings are then removed from the quenching liquid to minimise stress cracking. Cooling fluids of other types such as oil or even ambient air do not remove heat from the castings as quickly or as evenly as an aqueous solution.

The alloy steel casting then requires tempering to obtain the desired mechanical properties (degree of strength and ductility). Castings are placed into a cold furnace (less than 250° C.) and the furnace temperature is raised. In embodiments of the tempering process of the present invention, the hardened steel is tempered by then heating to a tempering temperature in the range about 200° C. to about 650° C. In one embodiment the casting is heated to 550° C. for a period of time and then water quench cooled. In another embodiment the casting is heated to around 250° C. for a period of time and then air cooled. The tempering temperature and the subsequent method of cooling the casting will be selected depending on the desired final hardness of the parent material of the casting.

The tempering temperature is maintained for a minimum interval calculated depending on the thickness of the casting. In one embodiment the castings are held at the final tempering temperature for 2 hours per inch of casting thickness at its broadest point, for example a six inch thickness casting is tempered for 12 hours. In further embodiments of this process, steel of a different selected composition can be tempered at a different temperature.

Tempering of the steel is a process for redistributing the carbon atoms in the martensite lattice and reducing the stress or brittleness of the steel. Tropically an optimisation of the balance between the properties of strength and ductility of the steel is achieved so that the steel has desirable properties of each. Very brittle steels lack toughness and can fail when a load is applied.

Referring to the step of quenching the casting after tempering, a water quench is a rapid cooling which takes the casting through the metallurgical embrittlement transformation zones (which lie approximately between 300-500° C.) as quickly as possible to avoid the formation of undesirable properties associated with temper embrittlement. Typically the aqueous solution used to quench the casting is between 20-30° C. If a casting which is being tempered at temperatures as high as around 500-600° C. is air cooled, some embrittlement of the casting can arise due to possible uneven cooling rates of the casting, which is not experienced in an aqueous quench.

These heat-treatment steps are carried out to produce a desired metallurgical outcome in the casting microstructure. Although it is known to hard-face steel castings by welding application of a hard material to a portion of the exterior of the casting, in the past this has often been done after the hardening and tempering heat-treatment steps. The metal microstructure of the region of the casting near to its surface can be altered by the welding process, producing a heat affected zone. By arranging the hardening and tempering heat treatment steps after the welding step, the inventors have shown that the metal microstructure of the casting can be transformed so that the microstructure of the casting itself is not embrittled but becomes similar to the rest of the casting. Without embrittlement the portion of the casting in the heat affected zone is less likely to experience crack propagation, leading ultimately to a failure of the hard-facing layer and the parent casting.

The inventors have surprisingly discovered that the hard-facing layer which is welded onto the steel casting does not fracture off when the casting is subjected to the extreme temperature gradients of hardening and tempering processes, for example when the casting is hardened by heating to above the austenitising temperature of the steel and then rapidly cooled by quenching in an aqueous solution, as has been described. In fact the transformation of the metal microstructure of the casting in the heat affected zone can assist the bonding of the hard-facing layer to the casting.

The superior resistance of the hard-faced steel member of the invention to abrasive wear is likely to be of great value in mining and industrial applications where both high strength and impact resistance are desirable. The hardening and tempering steps of the invention can be arranged to produce a steel product of any suitable mechanical requirements, depending upon the application. The processes described are not to be considered limited to steel castings, and can be applied using any type of steel or alloy steel member.

It is to be understood that, if any prior art information is referred to herein, such reference does not constitute an admission that the information forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Whilst the invention has been described with reference to preferred embodiments it should be appreciated that the invention can be embodied in many other forms.

The invention claimed is:

1. A method of treating an alloy steel member comprising the steps of:
   attaching by welding a hard-facing to the member, the hard-facing comprising a weld alloy matrix and hard particulates in the matrix; heating the product to above the austenitizing temperature, quenching the product in an aqueous solution to achieve a martensitic structure, and tempering the product and cooling the product; whereby a hard faced steel member product is provided; characterized in that the hard particles are rounded and substantially evenly sized in the range of about 0.5 mm to about 5 mm and in that the weld matrix alloy is of the same composition as the allow steel member, wherein the steel member comprises an alloy steel chosen from a steel having a composition by weight percent of:
   carbon less than about 0.5%;
   manganese less than about 1.2%;
   silicon less than about 2.0%;
   nickel less than about 3.0%;
   chromium less than about 2.5%;
   molybdenum less than about 1.0%;
   the balance being iron, incidental ingredients and trace impurities.

2. The method as claimed in claim 1 wherein the hard particulates are substantially spherical.

3. The method as claimed in claim 1 wherein the product is hardened by heating it in excess of the austenitizing temperature for a minimum interval calculated depending on the thickness of the product.

4. The method as claimed in claim 1 wherein the temperature at which the product is hardened is about 900° C. to about 1000° C.

5. The method as claimed in claim 1 wherein the product is quenched in an aqueous solution until the product is cooled to an ambient temperature.

6. The method as claimed in claim 1 wherein the product is tempered by heating it at the tempering temperature for a minimum interval calculated depending on the thickness of the product.

7. The method as claimed in claim 6 wherein the tempering temperature is in the range about 200° C. to about 650° C.

8. The method as claimed in claim 1 wherein the hard particulate substance is one of the group comprising sintered tungsten carbide and macrocrystalline tungsten carbide.

9. The method as claimed in claim 1 and wherein the step of tempering the member prior to hard facing is at a temperature in the range about 550° C. to about 700° C.

10. The method as claimed in claim 9 wherein the tempering temperature used prior to hard facing is in the range about 600° C. to about 650° C.

11. A method as claimed in claim 1, wherein the member is normalized at a temperature in the range of about 900° C. to about 1000° C. and then subjected to a period of air cooling, prior to welding the hard-facing.

12. A method as claimed in claim 1, wherein welding is effected by MIG welding and the hard particulates are applied to a molten pool of the welding matrix at a pre-determined rate.

13. A method as claimed in claim 12, wherein the electrical supply current, voltage, travel speed and nozzle distance of the MIG welder are controlled relative to the surface of the product.

14. A method as claimed in claim 1, wherein the hard particulates comprise tungsten carbide and the method includes controlling the supply current to the MIG welder in order to control the temperature of the molten matrix to substantially obviate the formation of eta tungsten carbide.

15. A method of hard-facing a steel member as claimed in claim 1, wherein the member is normalised at a temperature in the range of 900° C. to 1000° C., followed by a period of air cooling, and tempering in the range of 600° C. to 650° C., before welding:
- the post welding austenitizing temperature is in the range 900° C. to 1000° C. and the tempering is in the range 200° C. to 650° C.;
- the hard particulates are in the range of 0.7 mm to 1.5 mm and are of tungsten carbide; and
- the welding is conducted using MIG welding with the tungsten carbide particles being suspended in a molten pool of the welding matrix.

16. A hard-faced steel member, the steel member being an alloy steel casting having a hard-facing comprising hard particulates in a matrix welded on to the steel casting, the steel member having a structure corresponding to heating the member to above the austenitizing temperature, water quenching the member, tempering the product and cooling the member; characterised in that the hard particulates are rounded and substantially evenly sized and in the range of about 0.5 mm to about 5 mm; and in that the weld matrix alloy is of the same composition as the alloy steel member, wherein the alloy steel member comprises an alloy steel chosen from a steel having a composition of:
- carbon less than about 0.5%;
- manganese less than about 1.2%;
- silicon less than about 2.0%;
- nickel less than about 3.0%;
- chromium less than about 2.5%;
- molybdenum less than about 1.0%;
- the balance being iron, incidental ingredients and trace impurities.

17. A member as claimed in claim 16, wherein the particulates are of tungsten carbide.

* * * * *